United States Patent
LaVallee, III

(10) Patent No.: US 9,933,085 B2
(45) Date of Patent: Apr. 3, 2018

(54) INTEGRATING VALVE WITH SOFT START

(71) Applicant: Hamilton Sundstrand Corporation, Windsor Locks, CT (US)

(72) Inventor: Earl Jean LaVallee, III, Glastonbury, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 559 days.

(21) Appl. No.: 14/584,455

(22) Filed: Dec. 29, 2014

(65) Prior Publication Data
US 2016/0186885 A1    Jun. 30, 2016

(51) Int. Cl.
*F16K 31/122* (2006.01)
*F16K 1/22* (2006.01)

(52) U.S. Cl.
CPC .......... *F16K 31/1225* (2013.01); *F16K 1/221* (2013.01); *F16K 31/1223* (2013.01)

(58) Field of Classification Search
CPC ... F16K 31/1223; F16K 31/1225; F16K 1/221
USPC .......................................................... 60/785
See application file for complete search history.

(56) References Cited

U.S. PATENT DOCUMENTS

| | | | |
|---|---|---|---|
| 3,189,050 A * | 6/1965 | Heckmann | F15B 13/0402 137/625.63 |
| 3,746,046 A | 7/1973 | Werner et al. | |
| 3,898,912 A | 8/1975 | Wills et al. | |
| 6,708,489 B2 | 4/2004 | Massey et al. | |
| 2014/0366965 A1* | 12/2014 | Simpson | B64D 13/04 137/500 |

OTHER PUBLICATIONS

Patrick H. Oosthuizen, Introduction to Compressible Fluid Flow, Second Edition, CRC Press, pp. 209-212.*

* cited by examiner

*Primary Examiner* — Phutthiwat Wongwian
*Assistant Examiner* — Loren Edwards
(74) *Attorney, Agent, or Firm* — Kinney & Lange, P.A.

(57) ABSTRACT

A valve includes a modulating chamber for sending and receiving fluid through a first chamber port, a supply chamber, and a damping chamber for sending and receiving a second fluid through a damping chamber port. The valve also includes a passageway between the damping chamber and the supply chamber, and a piston assembly movable within the valve, wherein the piston assembly is configured to open and close a flow control device. The piston assembly includes a rod, a modulating piston attached to the rod movable within the modulating chamber, a supply piston attached to the rod movable within the supply chamber, and a damping piston attached to the rod movable within the passageway and the supply chamber. The piston assembly also includes a damping piston bypass that provides a restricted flow passage between the supply chamber and the damping chamber when the damping piston is located in the passageway.

15 Claims, 3 Drawing Sheets

INTEGRATING VALVE WITH SOFT START

BACKGROUND

Pneumatic valves are one of many components of a system that controls the flow of a fluid through the system. Pneumatic valves are control devices that are powered by pressurized fluid, normally air. In many circumstances, pneumatic pressure is supplied to the driving portion of the valve from a pressure source. The driving portion of the valve transforms pneumatic pressure into mechanical power for operating or actuating a control mechanism in a supply line, duct, or pipe. The control mechanism may be an isolation valve having only two positions, open and closed, where the open position allows flow to pass and the closed position stops flow. The control mechanism may also be a control valve that is capable of modulating flow of the fluid it is controlling. For example, the control valve may allow fluid to pass in increments of one percent from zero percent to one hundred percent.

There are many different types of control mechanisms that may be connected to a pneumatic driver, such as ball valves, butterfly valves, or gate valves. These valves may be used in many applications such as pneumatic tools, industrial processes, and aircraft environmental control systems. In one example, a pneumatic valve may be part of a butterfly valve control mechanism operated by a pneumatic driver in a bleed system of an environmental control system of an aircraft. In this example, pneumatic pressure may be taken from a high pressure supply line to ultimately control a butterfly valve which modulates the flow of pressurized air through a duct, tube, or pipe in an aircraft environmental control system. In this example, careful consideration must be made of flow rates and pressures, as an environmental control system is critical to the operation of the aircraft.

SUMMARY

In one embodiment, a valve includes a modulating chamber for sending and receiving fluid through a first chamber port, a supply chamber, and a damping chamber for sending and receiving a second fluid through a damping chamber port. The valve also includes a passageway between the damping chamber and the supply chamber, and a piston assembly movable within the valve, wherein the piston assembly is configured to open and close a flow control device. The piston assembly includes a rod, a modulating piston attached to the rod movable within the modulating chamber, a supply piston attached to the rod movable within the supply chamber, and a damping piston attached to the rod movable within the passageway and the supply chamber. The piston assembly also includes a damping piston bypass that provides a restricted flow passage between the supply chamber and the damping chamber when the damping piston is located in the passageway.

Another embodiment is a method for controlling a valve with an actuator having a modulating chamber, a damping chamber, a supply chamber, a passageway, and a piston assembly having modulating, supply, and damping pistons connected together, wherein the modulating piston is movable in the modulating chamber, the supply piston is movable in the supply chamber, and the damping piston is movable between the passageway and the damping chamber, and wherein a damping piston bypass provides a restricted flow passage between the supply chamber and the damping chamber when the damping piston is located in the passageway. The method includes connecting a port of the modulating chamber to an upstream pressure to cause movement of the piston assembly that opens the valve. The method also includes exhausting air from the supply chamber to the damping chamber and then to the upstream source at a first rate while the damping piston is in the passage, and at a second rate when the damping piston is located in the damping chamber.

DETAILED DESCRIPTION

Figure 1:
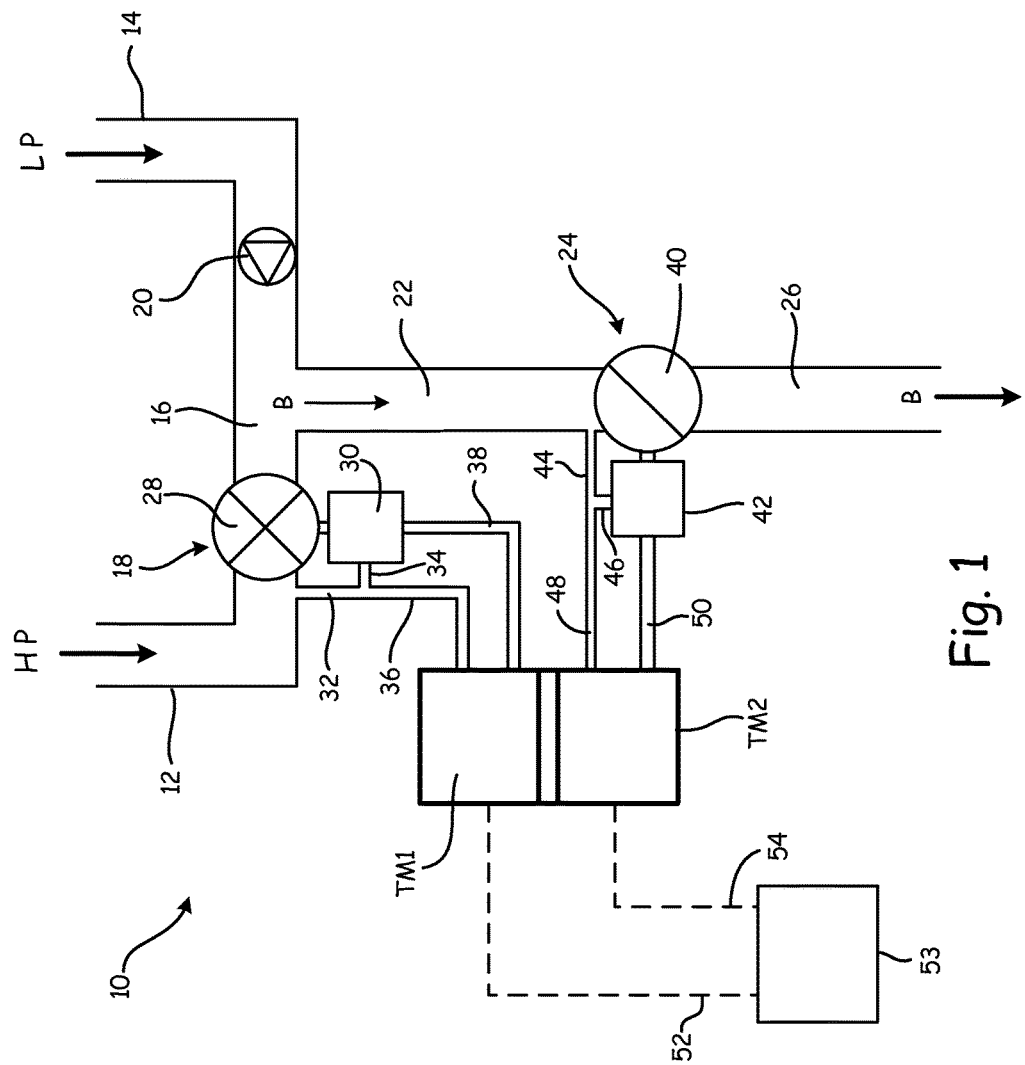
FIG. 1 is a schematic view of a pneumatic control system.

FIG. 1 is a schematic view of bleed control system 10, which includes high pressure inlet duct 12, low pressure inlet duct 14, bleed duct 16, isolation valve 18, check valve 20, bleed stream outlet duct 22, integrating valve 24, and discharge duct 26. Isolation valve 18 includes isolation valve body 28 and isolation valve driver 30. Bleed control system 10 also includes isolation valve control duct 32, isolation valve damping duct 34, isolation valve bypass duct 36, and isolation valve modulating duct 38. Integrating valve 24 includes integrating valve body 40 and integrating valve driver 42. Bleed control system 10 also includes integrating valve control duct 44, integrating valve damping duct 46, integrating valve bypass duct 48, and integrating valve modulating duct 50. Bleed control system 10 also includes torque motors TM1 and TM2 and torque motor controls 52 and 54 and controller 53. Also displayed in FIG. 1 are high pressure stream HP, low pressure stream LP, and bleed stream B.

High pressure inlet duct 12 connects to the inlet of isolation valve 18 and isolation valve control duct 32. Connected to the outlet of isolation valve 18 is bleed duct 16. Low pressure duct 14 connects to the inlet of check valve 20. The outlet of check valve 20 is connected to a second inlet of bleed duct 16, which has a single outlet. The single outlet of bleed duct 16 is connected to bleed stream outlet duct 22, which connects to the inlet of integrating valve 24 and integrating valve control duct 44. The outlet of integrating valve 24 is connected to discharge duct 26, which may connect to other components within a bleed system, environmental control system, or any other system utilizing pressurized air.

Isolation valve body 28 and isolation valve driver 30 are physically and mechanically connected. Similarly, integrating valve body 40 and integrating valve driver 42 are physically and mechanically connected.

Isolation valve control duct 32, which connects to high pressure inlet duct 12, also connects to isolation valve damping duct 34 and isolation bypass duct 36. The other end of isolation damping duct 34 connects to one inlet, which can be a port, of isolation valve driver 30. The other end of isolation valve bypass duct 36 connects to torque motor TM1. Also connected to torque motor TM1 is isolation modulating duct 38, which connects to a second inlet, or port, of isolation valve driver 30. Electrically connected to torque motor TM1 is control input 52.

Integrating valve control duct 44, which connects to bleed stream outlet duct 22, also connects to integrating valve damping duct 46 and integrating bypass duct 48. Integrating damping duct 46 also connects to one inlet, which can be a port, of integrating valve driver 42. The other end of integrating valve bypass duct 48 connects to torque motor TM1. Also connected to torque motor TM1 is integrating modulating duct 50, which connects to a second inlet, or port, of isolation valve driver 42. Electrically connected to torque motor TM2 is control input 54. Control inputs 52 and 54 are also electrically connected to controller 53.

The ducts of bleed system 10 may be metal or plastic ducting or tubing, or any other material capable of transporting pressurized air. This includes high pressure inlet duct 12, low pressure inlet duct 14, bleed duct 16, bleed stream outlet duct 22, isolation valve control duct 32, isolation valve damping duct 34, isolation valve bypass duct 36, isolation valve modulating duct 38, integrating valve control duct 44, integrating valve damping duct 46, integrating valve bypass duct 48, and integrating valve modulating duct 50.

High pressure stream HP may be provided to bleed system 10 from a high pressure compressor of a turbine engine or another high pressure source. High pressure stream HP then flows into high pressure inlet duct 12 where it can either travel through isolation valve 18, or be stopped by isolation valve 18. Isolation valve 18 may be a butterfly, ball, globe, gate or any other type of valve capable of isolating flow. Low pressure stream LP may be provided to bleed system 10 from a low pressure source of a gas turbine engine or other low pressure source within an environmental control system of an aircraft. Low pressure stream LP then flows into low pressure inlet duct 14 and then encounters check valve 20. Check valve 20 allows flow to move only from low pressure stream inlet duct 14 to bleed duct 16 and check valve 20 prevents flow from moving from bleed duct 16 to low pressure inlet duct 16. When Isolation valve 18 is open, high pressure stream HP continues to bleed duct 16 where it becomes bleed stream B. When isolation valve 18 is closed, low pressure stream LP may travel through check valve 20 and into bleed duct 16, where low pressure stream LP becomes bleed stream B.

At this point either high pressure stream HP or low pressure stream LP becomes bleed stream B. Bleed stream B then travels through bleed stream outlet duct 22 where it encounters the inlet of integrating valve 24. In this embodiment, integrating valve 24 is a butterfly type valve, but may be any type of control valve capable of being pneumatically driven. Integrating valve 24 may modulate to allow bleed stream B to pass through integrating valve 24 at flow rates ranging from zero percent to one hundred percent of the full flow rate of bleed stream B. Following its passage through integrating valve 24, bleed stream B passes through discharge duct 26, where bleed stream B is discharged from bleed system 10 into another portion of a larger bleed system, or another portion of an environmental control system.

Before bleed stream B enters integration valve 24, a portion of bleed stream B will enter integration valve control duct 44. Integration valve control duct 44 will then distribute that portion of bleed stream B to integration valve damping duct 46 and integration valve bypass duct 48. The portion of bleed stream B entering integration valve damping duct 48 will continue into a chamber of integration valve driver 42. The portion of bleed stream B entering torque motor TM2 will be subjected to control through nozzles within torque motor TM2. Based on control signals sent from controller 53 to control input 54, torque motor TM2 will direct air to integration valve driver 42 to cause an operating mechanism within isolation valve body 40 to open or close, incrementally. Controller 53 may receive control inputs from sensors of systems downstream or upstream of bleed system 10. For example, controller 53 may receive control inputs from pressure, temperature, differential pressure, or flow rate sensors. Controller 53 may then determine, based on these inputs, if any component downstream of bleed system 10 requires flow. This functionality is described in further detail in FIG. 2.

Similarly, before high pressure stream HP enters isolation valve 18, a portion of high pressure stream HP will enter isolation control duct 32. Isolation valve control duct 32 will then distribute that portion of high pressure stream HP to isolation valve damping duct 34 and isolation valve bypass duct 36. The portion of high pressure stream HP entering isolation valve damping duct 24 will continue into a chamber of isolation valve driver 30. The portion of high pressure stream HP entering torque motor TM1 will be subjected to control through nozzles within torque motor TM1. Based on control signals sent by controller 53 through control input 52, torque motor TM1 will direct air to isolation valve driver 30 to cause an operating mechanism within isolation valve body 28 to open or close.

Figure 2:
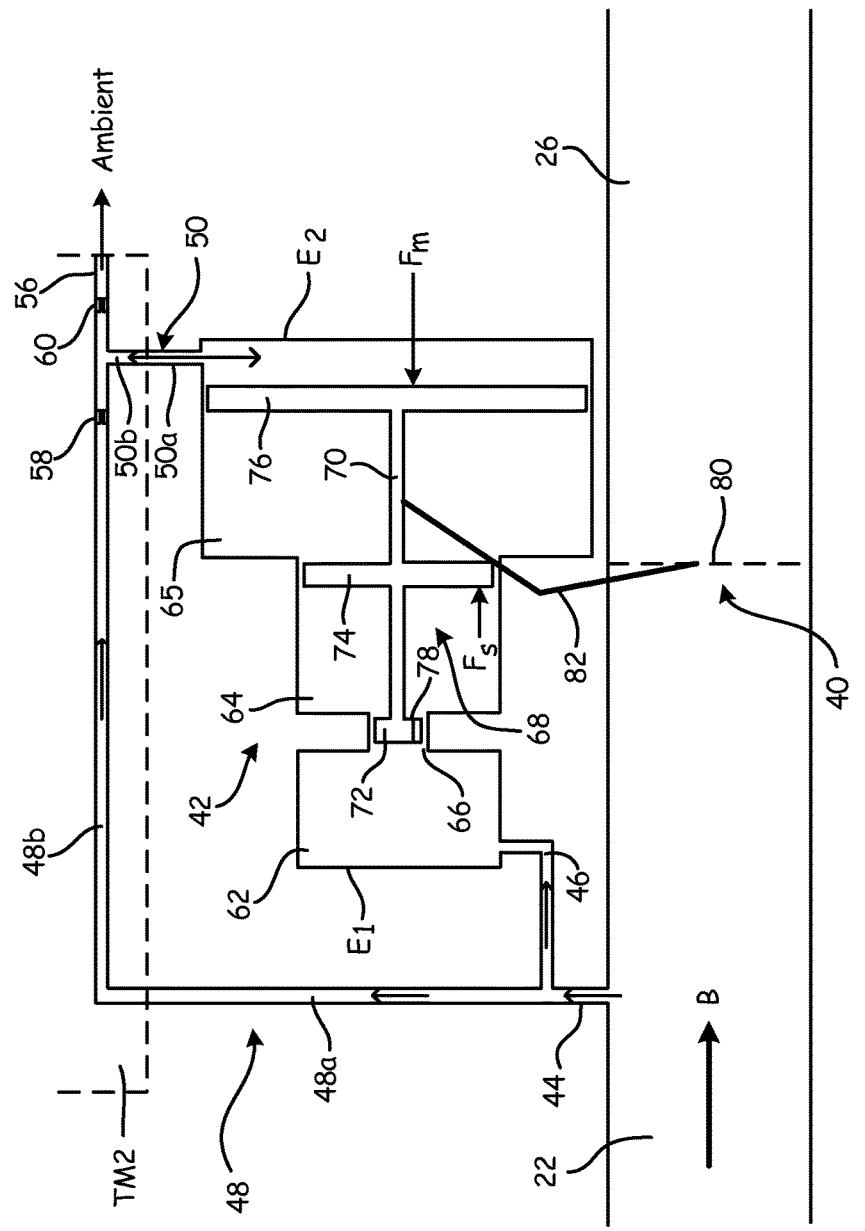
FIG. 2 is a schematic view of a bleed control system and a cross-sectional view of an integrating valve in a first condition.

FIG. 2 is a schematic view of a portion of bleed control system 10 and a cross-sectional view of integrating valve 24 in a first condition. Bleed control system 10 of FIGS. 2 and 3 includes integrating valve 24, bleed stream outlet duct 22, discharge duct 26, integration valve control duct 44, integration valve damping duct 46, integration valve damping duct 48, integrating valve modulating duct 50, and torque motor TM2. Torque motor TM2 includes exhaust duct 56, upstream nozzle 58, and downstream nozzle 60. Also displayed within torque motor TM2 is internal portion of integration valve damping duct 48b and internal portion integrating valve modulating duct 50b. External portion of integration damping duct 48a and external portion integrating valve modulating duct 50a are also included in bleed control system 10.

Integrating valve 24 includes integrating valve body 40, integrating valve driver 42, and linkage 82. Integrating valve body includes disc 80. Integrating driver includes damping chamber 62, supply chamber 64, and modulating chamber 65. Integrating valve 24 also includes passageway 66, and piston assembly 68. Piston assembly 68 includes piston rod 70, damping piston 72, supply piston 74, modulating piston 76, and damping piston bypass 78. Also displayed are bleed stream B, ends E1 and E2, supply force Fs, and modulating force Fm.

Consistent with FIG. 1, bleed stream outlet duct 22 connects to the inlet of integrating valve 24. The outlet of integrating valve 24 is connected to discharge duct 26. Also connected to bleed stream outlet duct 22 is integrating valve control duct 44, which also connects to integrating valve damping duct 46 and integrating bypass duct 48, specifically integrating bypass duct 48a. Integrating damping duct 46 also connects to integrating valve driver 42 at damping chamber 62 near end E1.

Integrating bypass duct 48a continues into torque motor TM2 where it becomes integrating bypass duct 48b. Within torque motor TM2 integrating bypass duct 48b connects to integrating valve modulating duct 50 and exhaust duct 56. Upstream nozzle 58 is located in integrating bypass duct 48b upstream of this connection. Located downstream of this connection in exhaust duct 56 is downstream nozzle 60. Upstream nozzle 58 and downstream nozzle 60 are connected to each other by a linkage (not displayed) causing one nozzle to open when the other closes, and vice versa. Further downstream in exhaust duct 56 is the termination of exhaust duct 56 to ambient. Modulating duct 50b is the portion of modulating duct 50 connected to integrating bypass duct 48a. Modulating duct 50b continues out of torque motor TM2 where it becomes supply duct portion 50a, eventually connecting to modulating chamber 65 at end E2. Electrically connected to torque motor TM2 is control input 54.

Within integrating valve driver 42 is piston assembly 68. Damping piston 72 resides within passageway 66, which is located between damping chamber 62 and small supply chamber 64. Damping piston 72 is connected to the end of piston rod 70 most near end E1 of integrating valve driver 42. Damping piston bypass 78 is a hole or other passageway that passes through damping piston 72 or otherwise bypasses damping piston 72. Modulating piston 76 is connected to piston rod 70 at the end of piston rod 70 nearest end E2 of integrating valve driver 42. Modulating piston 76 is located inside modulating chamber 65. Supply piston 74 is located between damping piston 72 and modulating piston 76 in supply chamber 64, where supply piston 74 is connected to piston rod 70. Damping piston 72, supply piston 74, and modulating piston 76 may be fastened to piston rod 70 using pins, a welding process, or other fastening means or device. Or, damping piston 72, supply piston 74, and modulating piston 76 may be integrated into a single part with piston rod 70. Also connected to piston rod 70 is linkage 82. Linkage 82 also connects to disc 80, which is located within integrating valve body 40.

Piston assembly 68 is movable within integrating valve driver 42. However, modulating piston 76 is only movable within modulating chamber 65 and supply piston 74 is only movable within supply chamber 64. Damping piston 72 is movable within passageway 66 and may move from passageway 66 into damping chamber 62, but may not move into supply chamber 64.

Damping piston 72 forms a seal in passageway 66, allowing little or no air to travel around damping piston 72. Similarly, supply piston 74 forms a seal in supply chamber 64, and modulating piston 76 forms a seal in modulating chamber 65. Disc 80, in the closed position (as shown in FIG. 2), forms a seal in integrating valve body 40 and therefore in bleed stream discharge duct 22. This seal prevents bleed stream from flowing from bleed stream discharge duct 22 to discharge duct 26. Damping piston bypass 78 is a passageway that allows fluid to pass through damping piston 72. Damping piston bypass 78 may be a hole drilled through damping position 72, can be a gap in the seal around damping piston 72, or another port or passage within integrating valve driver 42 connecting damping chamber 62 to supply chamber 64.

Linkage 82 is pivotably connected to piston rod 70. Linkage 82 transforms linear motion of piston assembly 68 into rotational motion of disc 80. Disc 80 is shown in the closed position, stopping bleed stream B from flowing to discharge duct 26.

The remainder of the functionality of FIG. 2 is discussed below, concurrently with FIG. 3, to more accurately convey the operation of integrating valve 24 in bleed system 10.

Figure 3:
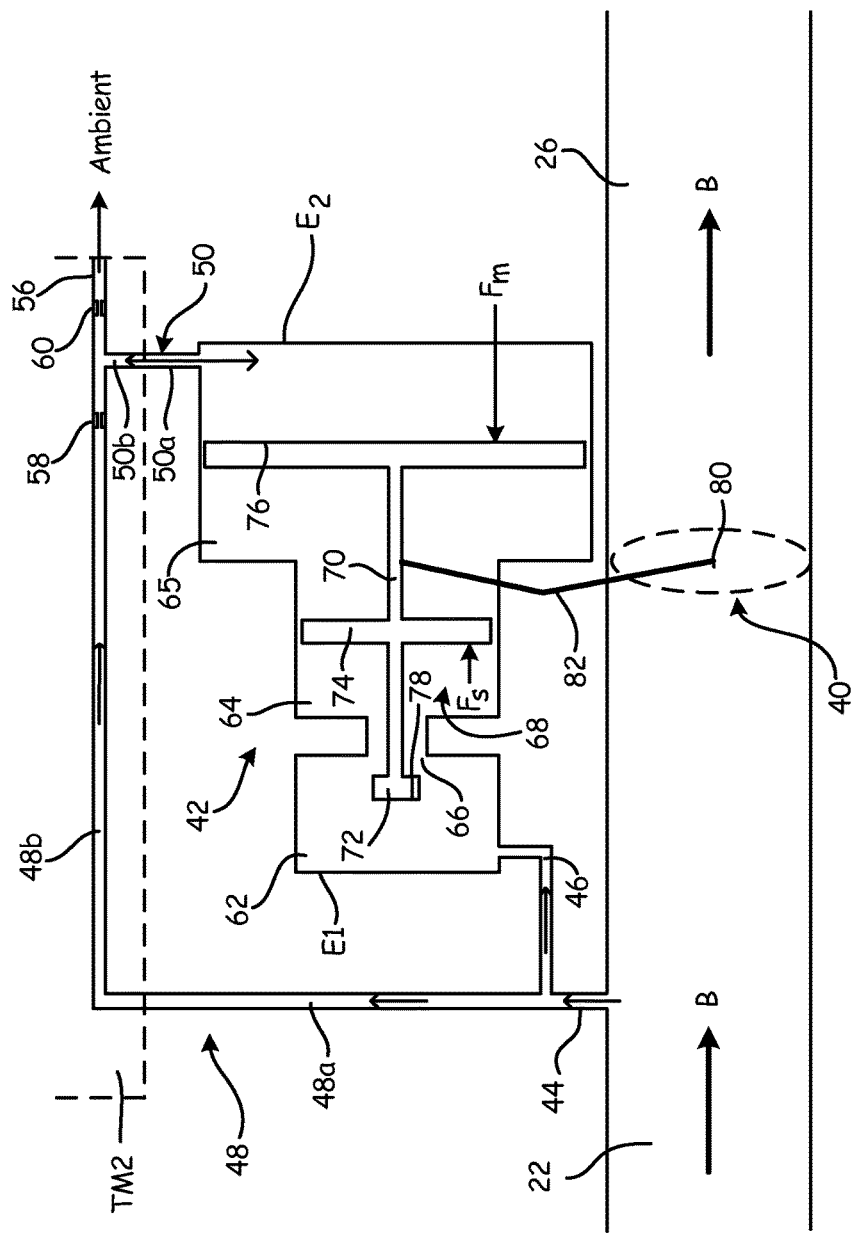
FIG. 3 is a schematic view of a bleed control system and a cross-sectional view of an integrating valve in a second condition.

FIG. 3 is a schematic view of a portion of bleed control system 10 and a cross-sectional view of integrating valve 24 consistent with FIG. 2, but in a second condition. The components and connections of FIG. 3 are all consistent with FIG. 2, but the positions of the components differ.

In the condition shown in FIG. 3, damping piston 72 resides within damping chamber 62, and only piston rod 70 resides (partially) in passageway 66. Modulating piston 76 is located in modulating chamber 65, but is located closer to end E1 than modulating piston 76 of the first condition shown in FIG. 2. Supply piston 74 is located in supply chamber 64, but is located closer to end E1 than modulating piston 76 of the condition shown in FIG. 2.

The portion of linkage 80 connected to piston rod 70 is located closer to end E1 than the portion of linkage 80 connected to piston rod 70 of the condition shown in FIG. 2. This position change results in the rotation of disc 80 within valve body 40, creating a partially open condition, where bleed stream B may flow through integration valve 24 and on to discharge duct 26.

When piston assembly 68 is positioned in accordance with FIG. 2, disc 80 is in a closed position, preventing bleed stream B from passing through integration valve 24. In this condition upstream nozzle 58 will be in a closed position preventing bleed stream B from travelling to integrating valve supply duct 50. However, a portion of bleed stream B will travel through integrating valve control duct 44 to integrating valve bypass duct 48, where it will be stopped at upstream nozzle 58. Similarly, a portion of bleed stream B will travel through integrating valve control duct 44 to integrating valve damping duct 46 and into damping chamber 62. Damping chamber 62 will be pressurized by bleed stream B. Another portion of bleed stream B will travel through damping piston bypass 78 and into supply chamber 64, where bleed stream B will be stopped by supply piston 74, and will pressurize supply chamber 64.

The portion of bleed stream B that pressurizes supply chamber 64 will apply a pressure onto the side of supply piston 74 most near end E1. This pressure results in force Fs, shown in FIGS. 2 and 3. While nozzle 58 is closed, nozzle 60 will be open, exposing the end of modulating piston 76 most near end E2 to ambient pressures, which will be lower than the pressure of bleed stream B. The result is that force Fs is greater than force Fm, maintaining the position of piston assembly 68 shown in FIG. 2, and therefore maintaining the position of disc 80 shown in FIG. 2.

As discussed in FIG. 1, controller 53 may determine, based on a control input, that a component downstream of bleed system 10 requires flow. In this case, it is desired to allow bleed stream B to pass through integration valve 24. Then, controller 53 may send a control signal to control input 54 of torque motor TM2 instructing TM2 to open integrating valve 24. Torque motor TM2 can then open upstream nozzle 58, simultaneously closing downstream nozzle 60. This allows bleed stream B to flow into modulating chamber 65 on the side of modulating piston 76 most near end E2, causing the pressure acting on the side of modulating piston 76 most near end E2 to rise.

The face area of modulating piston 76 is larger than the face area of supply piston 74. As F=P*A, (where F is force, P is pressure, and A is area), the same pressure acting on the face of modulating piston 76 results in force Fm being larger than force Fs. In many cases, Force Fm may become larger than Fs, even when the pressure acting on modulating piston 76 is smaller than the pressure acting on supply piston 74.

Therefore, when upstream nozzle 58 begins opening and downstream nozzle 60 begins closing, the pressure acting on modulating piston 76 begins to rise and force Fm begins to rise as well. Due to the face area of modulating piston 76 being greater than the face area of supply piston 74, force Fm will become greater than force Fs before the pressure acting on modulating piston 76 equals the pressure acting on supply piston 74. When force Fm becomes greater than force Fs, the force balance on piston assembly 68 will result in movement of piston assembly 68 in the direction of force Fm.

As force Fm overcomes force Fs and piston assembly 68 moves in the direction of force Fm, the fluid in supply chamber 64 will be compressed by supply piston 74, raising the pressure of the fluid within supply chamber 64. Similarly, damping piston 72 will compress fluid within damping chamber 62, raising the pressure of the fluid within damping chamber 62. As the pressure within damping chamber 62 and supply chamber 64 increases, the fluid in these chambers will naturally flow to lower pressure volumes connected to the damping chamber 62 and supply chamber 64. In this case, damping chamber 62 and supply chamber 64 are connected to damping duct 46 and bleed stream outlet duct 22, which will have a lower pressure than that of damping chamber 62 and supply chamber 64. Therefore, the fluid within these chambers will move to damping duct 46, integrating valve control duct 44, and bleed stream outlet duct 22.

More specifically, fluid from damping chamber 62 will move to damping duct 46, integrating valve control duct 44, and bleed stream outlet duct 22. Fluid from supply chamber 64 will move through damping piston bypass 78, into damping chamber 62, then to damping duct 46, and bleed stream outlet duct 22. However, fluid from supply chamber 64 will move out of supply chamber 64 at a reduced rate. This is because damping piston bypass 78 is physically small, having a small cross-sectional area, and therefore a high pressure drop relative to that of integrating valve damping duct 46. The pressure drop of damping piston bypass 78 causes the volume of fluid within supply passage 64 to move through damping piston bypass 78 at a flow rate lower than that the flow rate of the fluid moving from damping chamber 62 to damping duct 46, integrating valve control duct 44, and bleed stream outlet duct 22. This causes piston assembly 68 to be damped in motion. In other words, the motion of piston assembly 68 caused by force Fm being greater than force Fs is limited by the flow restriction caused by damping bypass 78.

As shown in FIG. 3, as piston assembly 68 continues to move in the direction of force Fm, damping piston 72 will eventually be moved out of passageway 66. Once damping piston 72 is moved out of passageway 66 and into damping chamber 62, the flow rate of fluid moving out of supply chamber 64 is no longer limited by damping piston bypass 78, because fluid may flow around damping piston 72 and on to damping duct 46, integrating valve control duct 44, and bleed stream outlet duct 22. This allows piston assembly 68 to move more quickly than when damping piston 72 is in passageway 66.

When piston assembly 68 moves due to force Fm becoming greater than force Fs (and any other forces acting on piston assembly 68), linkage 82 will articulate, rotating disc 80, and allowing bleed stream B to begin to flow through integrating valve 24 and on to discharge duct 26. Piston assembly 68 may continue to move in the direction of force Fm until piston assembly 68 has rotated disc 80 to a fully open position. At this point, or at any position of disc 80, controller 53 may hold the position of disc 80 by balancing force Fm and force Fs by controlling the flow of fluid through upstream nozzle 58 and downstream nozzle 60. Additionally, controller 53 may determine that the flow rate of bleed stream B flowing through integrating valve 24 needs to be reduced.

To reduce the flow rate of modulating stream M, controller 53 may send a control signal to control input 54 of torque motor TM2 instructing TM2 to close integrating valve 24. Torque motor TM2 can then begin to close upstream nozzle 58 and simultaneously open downstream nozzle 60. This allows the fluid within modulating chamber 65 being on the side of modulating piston 76 most near side E2 (which will be of a higher pressure than that of integrating modulating duct 50, exhaust duct 56, and ambient) to flow out of modulating chamber 65 to ambient, causing the pressure acting on the side of modulating piston 76 most near end E2 to decrease. This causes force Fm to decrease. Eventually, as upstream nozzle 58 continues to close and downstream nozzle 60 continues to open, force Fm will become smaller than force Fs. When force Fs become greater than force Fm (and any other forces acting on piston assembly 68), piston assembly 68 will begin to move in the direction of force Fs.

When piston assembly 68 moves in the direction of force Fs linkage 82 will articulate, rotating disc 80 towards a closed position, causing the flow of bleed stream B integrating valve 24 to reduce. When disc 80 reaches a fully closed position (as shown in FIG. 2), the flow of bleed stream B through integrating valve 24 will stop.

In some embodiments of bleed system 10, the volume of fluid upstream of integrating valve 24 may be significantly smaller than the volume of fluid downstream of integrating valve 24. In these embodiments, the pressure of the upstream volume will often be higher than pressure of the downstream volume when disc 80 of integrating valve 24 is closed. Therefore, when disc 80 begins to open, even slightly, the relatively high pressure of bleed stream B will rapidly flow downstream to the larger, lower pressure volume. The result is a large pressure drop, or rapid pressure decay, of the system volume upstream of integrating valve 24. Because of this rapid pressure decay, the pressure within damping chamber 62 will rapidly decrease as the volume of bleed stream B will quickly flow through integrating valve damping duct 46, integrating control duct 44, bleed stream outlet duct 22, past disc 80, and through discharge duct 26 to the lower pressure volume downstream of integrating valve 24.

Normally, in prior art, this rapid pressure decay would result in a reduction of force supply force Fs, causing piston assembly 68 to move rapidly, resulting in a rapid opening of disc 80. As disc 80 opens faster, the pressures upstream of disc 80 drop further, resulting in piston assembly 68 moving faster, and disc 80 opening faster. To summarize this scenario common in the prior art, once disc 80 is cracked, or slightly opened, the pressure upstream of disc 80 decays rapidly causing disc 80 to be forced to a fully opened position. Thereafter, a control system monitoring conditions of the environmental control system would need to counteract this phenomenon through the use of torque motor TM2.

However, in the present invention, this phenomenon is greatly reduced by the present invention's additional chambers, piston, and bypass passages not contained in the prior art. In the present invention, the rapid pressure decay caused by cracking disc 80 still causes the pressure of damping chamber 62 to rapidly decrease as the volume of bleed stream B quickly flows through integrating valve 24. However, the pressure in supply chamber 64 will not rapidly decay. This is because the pressurized volume of supply chamber 64 cannot easily flow through damping piston bypass 78, because damping piston bypass 78 is physically small, having a small cross-sectional area, and therefore a high pressure drop relative to that of integrating valve damping duct 46. The pressure drop of damping piston bypass 78 prevents the volume of bleed stream B within supply passage 64 from moving through damping piston bypass 78 at a high flow rate. As a result, the pressure in supply chamber 64 cannot rapidly decay, and therefore force Fs will not rapidly reduce and piston assembly 68 will move in a controlled manner, opening disc 80 in a similar fashion. In essence, rapid opening of disc 80 is prevented in a rapid pressure decay condition.

Rapid opening of disc 80 is undesirable, because controllability of the volumes and flow rates that disc 80 regulates will be lost or reduced, and controllability of an environmental control system is critical. However, it is not always desirable to inhibit rapid action of disc 80. At lower disc angles, or when the disc is first opening, it is desirable to prevent rapid opening of disc 80, but at higher disc angles, for example, when disc 80 is halfway open, it may be desirable to quickly adjust disc 80 from half open to fully open. Passageway 66 allows this to occur.

When piston assembly 68 moves in the direction of force Fm, eventually, damping piston 72 will move out of passageway 66 and into damping chamber 62. When this happens, as shown in FIG. 3, the volume of bleed stream B located in damping chamber 62 may flow around damping piston 72 and into supply chamber 64. And, the volume of bleed stream B located in supply chamber 64 may flow around damping piston 72 and into damping chamber 62. More notably, the volume of bleed stream B located in supply chamber 64 is not forced to flow through bypass passage 78. This means the volume of fluid acting on supply piston 74 is no longer restricted by the flow restriction of bypass passage 78. As a result, when damping piston 72 is in this configuration (shown in FIG. 3), torque motor TM2 may adjust nozzles 58 and 60, achieve an increase in force Fm, resulting in a quick movement of piston assembly 68 as the volume of bleed stream B in damping chamber 62, and supply chamber 64 may quickly move into bleed stream outlet duct 22.

In sum, after damping piston 72 has been moved out of passageway 66, as shown in FIG. 3, torque motor TM2 may quickly manipulate the set-point of disc 80, allowing for fast regulation of flow and pressure of bleed stream B passing through integrating valve 24. The result is integrating valve 24 prevents the undesired effects of quick opening due to rapid pressure decay at positions of disc 80 that are near closed (at lower disc angles), while still providing fast action and control of pressures and flow rates of bleed stream B when disc 80 is further open (at higher disc angles). In other words, integrating valve 24 has a soft start feature.

Damping piston bypass 78 may be sized to have the same face area as upstream nozzle 58 at a particular setting of nozzle 58 when nozzle 58 is just being opened. This prevents bleed stream B flowing out of supply chamber 64 through damping piston bypass 78 to damping chamber 62 at a rate higher than bleed stream B flows through upstream nozzle 58 and into modulating chamber 65. This contributes to the prevention of rapid opening of disc 80 due to rapid pressure decay.

Integrating valve control duct 44, integrating valve damping duct 46, integrating valve bypass 48, integrating modulating duct 50, and exhaust duct 56 may be ducts, pipes, tubes, ports or any other passageways capable of supporting pressurized flow. These passageways may be made of metal, plastic, or any other material suited for allowing the flow of pressurized fluid.

Piston rod 70, damping piston 72, supply piston 74, and modulating piston 76 can be made of steel, aluminum, plastic, or any other material allowing for piston assembly 68 to operate in accordance with this disclosure.

Disc 80, though described as a disc similar to that found in a butterfly valve, can also be a ball, gate, or any other flow modulating device.

Nozzles 58 and 60 can have single or multiple orifices and can be any geometric shape allowing for flow of fluid to be modulated under pressure.

Linkage 82 is shown as connecting to piston rod 70 between supply piston 72 and supply piston 74; however, linkage 82 may connect to piston rod 70 anywhere, so long as the functionality of linkage 82 described herein is maintained. Linkage 82 may be pinned, or otherwise pivotably mounted, so long as linkage 82 is capable of transforming the linear motion of piston assembly 68 into rotational motion of disc 80.

Though the present disclosure describes a valve being used in a bleed system of an environmental control system, the pneumatic valve described above may be used in any pneumatic control system. Further, the pneumatic valve described herein may be applied to hydraulics or any other fluid powered valve.

DISCUSSION OF POSSIBLE EMBODIMENTS

The following are non-exclusive descriptions of possible embodiments of the present invention.

In one embodiment, a valve includes a modulating chamber for sending and receiving fluid through a first chamber port, a supply chamber, and a damping chamber for sending and receiving a second fluid through a damping chamber port. The valve also includes a passageway between the damping chamber and the supply chamber, and a piston assembly movable within the valve, wherein the piston assembly is configured to open and close a flow control device. The piston assembly includes a rod, a modulating piston attached to the rod movable within the modulating chamber, a supply piston attached to the rod movable within the supply chamber, and a damping piston attached to the rod movable within the passageway and the supply chamber. The piston assembly also includes a damping piston bypass that provides a restricted flow passage between the supply chamber and the damping chamber when the damping piston is located in the passageway.

The valve of the preceding paragraph can optionally include, additionally and/or alternatively, any one or more of the following features, configurations and/or additional components.

The supply piston, the modulating piston, and the damping piston can have piston face areas, and the damping piston face area and the supply piston face areas can each be smaller than the modulating piston face area.

The damping piston bypass can include a channel through the damping piston.

The fluid can be air and the valve can be pneumatic.

A system can include the valve, and can further include a duct, an upstream pressure source, and a downstream component.

The flow control device can be located in the duct.

The system can include a torque motor for controlling the flow of the second fluid.

The torque motor can include an upstream nozzle positioned upstream of the modulating chamber port and a downstream nozzle positioned downstream of the modulating chamber port, where the nozzles are can be commanded to open and close.

The upstream nozzle can have a face area equivalent to a face area of the bypass.

The downstream component can have a volume that is larger than a volume located upstream of the pneumatic valve.

The upstream pressure source can be bleed air from a compressor section of a gas turbine engine.

The downstream component can be a component of an aircraft environmental control system.

The system can further include a controller that can send control signals to the torque motor, where the control signals can direct the torque motor to open and close the upstream and downstream nozzles.

Another embodiment is a method for controlling a valve, with an actuator having a modulating chamber, a damping chamber, a supply chamber, a passageway, and a piston assembly having modulating, supply, and damping pistons connected together, wherein the modulating piston is movable in the modulating chamber, the supply piston is movable in the supply chamber, and the damping piston is movable between the passageway and the damping chamber, and wherein a damping piston bypass provides a restricted flow passage between the supply chamber and the damping chamber when the damping piston is located in the passageway. The method includes connecting a port of the modulating chamber to an upstream pressure to cause movement of the piston assembly that opens the valve. The method also includes exhausting air from the supply chamber to the damping chamber and then to the upstream source at a first rate while the damping piston is in the passage, and at a second rate when the damping piston is located in the damping chamber.

The method of the preceding paragraph can optionally include, additionally and/or alternatively, any one or more of the following features, configurations and/or additional components, or steps.

The port of the modulating chamber can connect to an ambient pressure to cause movement of the piston assembly that can close the valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve comprising:
   a modulating chamber for sending and receiving a first fluid through a first chamber port;
   a supply chamber directly adjacent to the modulating chamber;
   a damping chamber for sending and receiving a second fluid through a damping chamber port;
   a passageway between the damping chamber and the supply chamber, the passageway directly adjacent to the damping chamber and the supply chamber, the passageway configured to provide the second fluid to the supply chamber from the damping chamber;
   a piston assembly movable within the valve, wherein the piston assembly is configured to open and close a flow control device, the piston assembly comprising:
      a rod;
      a modulating piston attached to the rod and movable within the modulating chamber, the modulating piston forming a seal within the modulating chamber between the first chamber port and the supply chamber, the first fluid providing a first pressure capable of moving the piston assembly towards the damping chamber;
      a supply piston attached to the rod and movable within the supply chamber, the supply piston forming a seal within the supply chamber, the second fluid providing a second pressure to the supply piston capable of moving the piston assembly away from the damping chamber when the second pressure is greater than the first pressure;
      a damping piston attached to the rod and movable only within the passageway and the damping chamber; and
      a damping piston bypass that provides a restricted flow passage between the supply chamber and the damping chamber when the damping piston is located in the passageway.

2. The valve of claim 1, wherein the supply piston, the modulating piston, and the damping piston have piston face areas, and wherein the damping piston face area and the supply piston face area are each smaller than the modulating piston face area.

3. The valve of claim 1, wherein the damping piston bypass comprises a channel through the damping piston.

4. The valve of claim 1, wherein the fluid is air and the valve is pneumatic.

5. A system, including the valve of claim 1, and further comprising a duct, an upstream pressure source, and a downstream component.

6. The system of claim 5, wherein the flow control device is located in the duct.

7. The system of claim 5 and further comprising a torque motor for controlling the flow of the second fluid.

8. The system of claim 7, wherein the torque motor comprises an upstream nozzle positioned upstream of the modulating chamber port and a downstream nozzle positioned downstream of the modulating chamber port, wherein the nozzles are commanded to open and close.

9. The system of claim 8, wherein the upstream nozzle has a face area equivalent to a face area of the bypass.

10. The system of claim 7 and further comprising a controller for sending control signals to the torque motor, wherein the control signals direct the torque motor to open and close the upstream and downstream nozzles.

11. The system of claim 5, wherein the downstream component has a volume that is larger than a volume located upstream of the pneumatic valve.

12. The system of claim 5, wherein the upstream pressure source is bleed air from a compressor section of a gas turbine engine.

13. The system of claim 12, wherein the downstream component is a component of an aircraft environmental control system.

14. A method for controlling the valve of claim 1, the method comprising:
   connecting the first chamber port of the modulating chamber to an upstream pressure to cause movement of the piston assembly that opens the valve;
   exhausting air from the supply chamber to the damping chamber and then to the upstream pressure at a first rate while the damping piston is in the passage, and at a second rate when the damping piston is located in the damping chamber.

15. The method of claim 14 and further comprising:
 connecting the first chamber port of the modulating chamber to an ambient pressure to cause movement of the piston assembly that closes the valve.

\* \* \* \* \*